3,108,105
HYDROXYALKYLAMINOPYRIMIDYL DIBENZANTHRONES

Max Staeuble, Basel, Switzerland, assignor to Ciba Limited, Basel, Switzerland, a company of Switzerland
No Drawing. Filed Mar. 13, 1961, Ser. No. 95,025
Claims priority, application Switzerland Mar. 15, 1960
4 Claims. (Cl. 260—256.4)

This invention provides valuable new anthraquinone vat dyestuffs corresponding to the general formula (1)

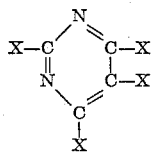

in which at least one X represents the radical of a vat dyestuff bound through a bridge, preferably an —NH- bridge, to the pyrimidine ring, and every remaining X represents a hydrogen atom or an alkyl, aryl, nitro or advantageously amino group which may be substituted.

The invention also provides a process for the manufacture of the above new dyestuffs, wherein a vat dyestuff, or an intermediate product convertible into a vat dyestuff by acylation, which contains at least one acylatable amino group, is condensed with a pyrimidine derivative of the general formula (2)

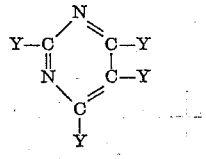

in which at least two Y's represent halogen atoms and every remaining Y represents a hydrogen atom or a substituent, and every mobile halogen atom remaining in the resulting primary condensation product is exchanged for an amino group.

As vat dyestuffs and vat dyestuff intermediates there may be mentioned more especially aminoanthraquinones, and among the latter above all monoamino-anthraquinones, for example, 1-aminoanthraquinone and simple substitution products thereof, such, for example, as 1-amino-4-, -5- or -6-methoxyanthraquinone, 1-amino-3-, -6- or -7-chloranthraquinone, 1-amino-4-, -5- or 8-acylamino- and more especially -benzoylamino-anthraquinones. The latter may be substituted in the benzoyl radical, for example, by halogen atoms or methoxy, alkyl, trifluoromethyl, sulfonamide or alkylsulfone groups.

There may also be mentioned 1:4-diamino-2-acetylanthraquinone and 1:4-diamino-2-benzoylanthraquinone, in which under normal conditions only the amino group in the 4-position can be acylated. There may also be mentioned aminoanthraquinones that further contain fused-on carbocyclic or heterocyclic rings, for example:

4-aminoanthraquinone-2:1(N)-acridone,
5-amino-1:9-isothiazole-anthrone,
4- or 5-aminoanthrapyrimidine,
Mono-aminoacedianthrones,
4- or 5-amino-1:1'-dianthrimide-carbazole,
4- or 5-amino-5'-benzoylamino-dianthrimide-carbazole, or 4-amino-4'-benzoylamino-dianthrimide-carbazole,
4-amino-anthrapyridones,
Aminodibenzanthrone, aminoisodibenzanthrone, aminodibenzpyrene-quinone, aminoanthanthrone, aminobenzanthrone and aminoflavanthrone.

As pyrimidine derivatives of the formula (2) there may be mentioned:

2:4:6-trichloropyrimidine,
2:4:6-tribromopyrimidine,
2:4:5:6-tetrachloropyrimidine,
2:4-dichloro-6-methylpyrimidine,
2:4-dichloro-5-nitropyrimidine,
2:4-dichloro-5-nitro-6-methylpyrimidine,
2:4:6-trichloro-5-nitropyrimidine,
2:6-dichloropyrimidine-4-carboxylic acid chloride, and
2:6-dichloropyrimidine-5-sulfonic acid chloride.

It is of advantage to use 1 molecular proportion of a monoamino-anthraquinone for every molecular proportion of the halogen-pyrimidine.

Every mobile halogen atom that remains in the resulting primary condensation product is exchanged for an amino group, for example, by reaction with ammonia or an arylamine, especially one of the benzene series such as aniline, ortho-, meta- or para-toluidine, or preferably with an aliphatic amine such, for example, as methylamine, dimethylamine, ethylamine, diethylamine, isopropylamine or butylamine, and more especially a hydroxyalkylamine, such as β-hydroxyethyl-amine, di-(hydroxyethyl)-amine, γ-hydroxypropylamine or an alkoxyalkylamine such as β-methoxyethylamine, or a halogen-alkylamine such as β-chlorethylamine, or a cycloalkylamine such as cyclohexylamine.

The reactions are advantageously carried out in an inert organic solvent, for example, nitrobenzene, chlorobenzene, ortho-dichlorobenzene or dimethylformamide, at an elevated temperature. In general, it is not necessary to isolate the halogenated primary condensation product, and it is of advantage to carry out both reactions in the same vessel.

The dyestuffs of the invention can be used, for example, as pigments, for coloring a wide variety of materials, and more especially for dyeing or printing textile materials of natural or regenerated cellulose by the conventional vat dyeing or printing methods.

The following examples illustrate the invention, the parts and percentages being by weight unless otherwise stated, and the relationship of parts by weight to parts by volume being the same as that of the kilogram to the liter:

Example 1

9.4 parts of aminodibenzanthrone are suspended while stirring, in 200 parts of dry nitrobenzene and the whole is heated to 160 to 170° C. A solution of 6 parts of 2:4:5:6-tetrachloropyrimidine in 50 parts of nitrobenzene is then added, followed by the addition of 0.5 part of pyridine, whereupon the mixture is stirred on for 20 hours at 170° C. and then cooled to room temperature.

The resulting condensation product of the probable formula

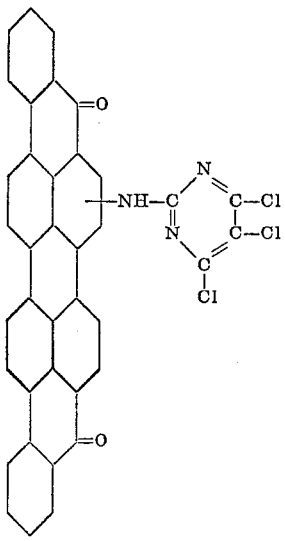

is then filtered off and washed successively with nitrobenzene and acetone. The filter cake is stirred in small portions at 150 to 160° C. into 100 parts of monoethanolamine and the mixture is refluxed for 2 hours, allowed to cool, poured into water and the dyestuff of the probable formula

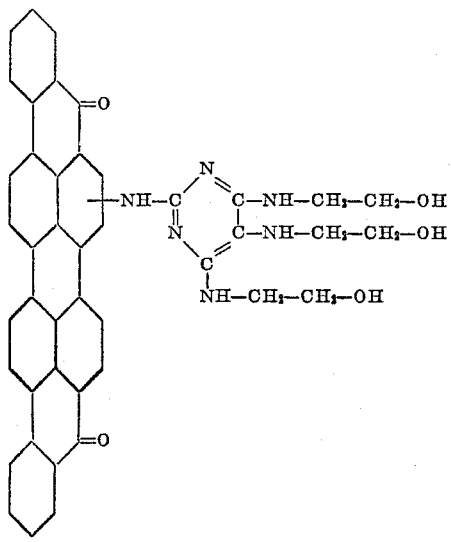

is filtered off, washed successively with water and acetone, and dried in vacuo at 60 to 70° C.

When dry, the new dyestuff forms a black powder which dyes cotton and regenerated cellulose from an alkaline hydrosulfite vat valuable black shades having excellent properties of fastness.

*Example 2*

9.4 parts of aminodibenzanthrone are suspended with stirring in 200 parts of dry nitrobenzene and the whole is heated to 160 to 170° C. A solution of 5.5 parts of 2:4:6-trichloropyrimidine in 40 parts of nitrobenzene is then added, the mixture is treated with 0.5 part of pyridine, stirred on for 20 hours at 190° C. and then cooled to room temperature. The resulting condensation product of the probable formula

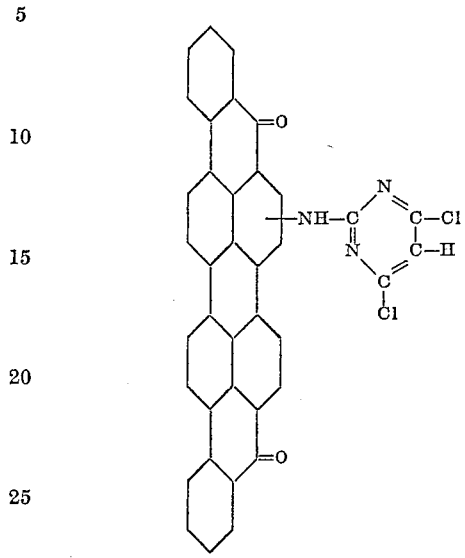

is filtered off and washed with nitrobenzene and then with acetone. The filter cake is cautiously stirred in small portions at 160 to 170° C. into 100 parts of diethanolamine and the mixture is stirred on for 2 hours at 170 to 180° C. The reaction mixture is then poured over 1000 parts of ice, and the dyestuff of the probable formula

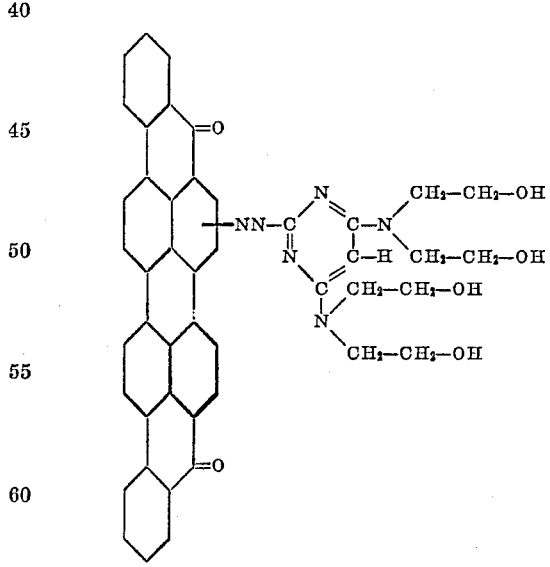

is filtered off, washed with water and then with acetone, and dried in vacuo at 60 to 70° C.

The new dyestuff dyes cotton and regenerated cellulose from blue-violet vat black shades having excellent fastness properties.

*Example 3*

The condensation product from aminodibenzanthrone and 2:4:6-trichloropyrimidine described in the first paragraph of Example 2 is cautiously stirred into 100 parts of boiling ethanolamine and the mixture is refluxed for 1½ hours. The dyestuff of the probable formula

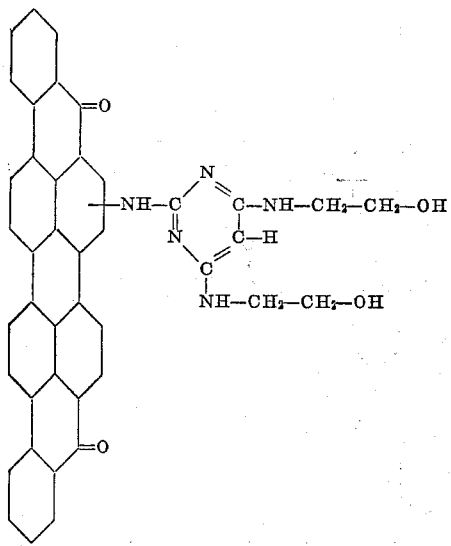

is isolated as described in Example 2. It dyes cotton and regenerated cellulose black shades of excellent fastness properties.

*Example 4*

5.0 parts of the condensation product from aminodibenzanthrone and 2:4:5:6-tetrachloropyrimidine prepared as described in Example 1 are heated in 80 parts of dimethylformamide and 20 parts of 2-amino-2-methyl-1:3-propanediol for 10 hours at 190° C. in an autoclave equipped with a stirrer; the mixture is then poured into water and the dyestuff is filtered off and dried. This new dyestuff of the probable formula

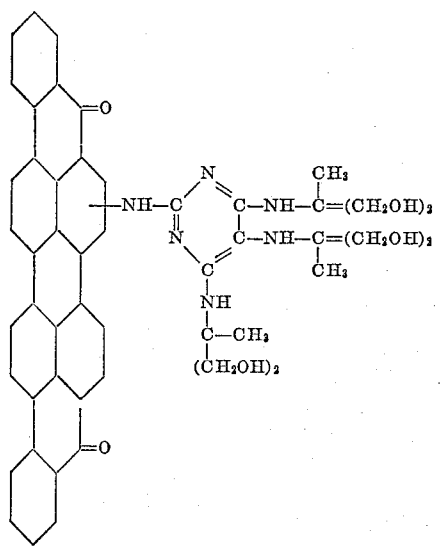

dyes cotton and regenerated cellulose from a blue-violet hydrosulfite vat black shades having very good fastness properties.

Dyestuffs that have equally good properties are obtained by replacing in this example 2-amino-2-methyl-1:3-propanediol by an equal amount of 2-aminobutanol or 2-amino-2-methylpropanol or tri-(hydroxymethyl)-aminomethane.

*Example 5*

A mixture of 15 parts of aminoacedianthrone, 250 parts of nitrobenzene, 15 parts of 2:4:5:6-tetrachloropyrimidine and 1 part of pyridine is heated with stirring for 9 hours at 170 to 175° C. and then allowed to cool. The condensation product is filtered off, washed with nitrobenzene and thoroughly expressed. The filter cake is stirred into 150 parts of cyclohexylamine and the mixture is refluxed for 2 hours and allowed to cool. The excess amine is then expelled with steam and the dyestuff is filtered off and dried. This dyestuff of the probable formula

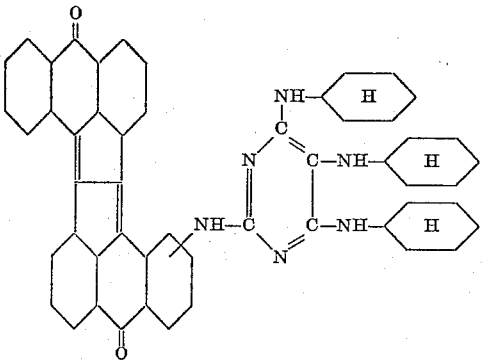

dyes cotton and regenerated cellulose from an alkaline hydrosulfite vat very fast brown shades.

When in this example cyclohexylamine is replaced by an equal amount of aniline and the mixture is heated for 2 hours at 180° C., a dyestuff of similar properties is obtained.

*Example 6*

0.8 part of the dystuff obtained as described in Example 1 in 100 parts of water is vatted in the presence of 6 parts by volume of sodium hydroxide solution of 30% strength with 2.4 parts of sodium hydrosulfite at 50 to 60° C. The stock vat thus prepared is added to a solution of 6 parts by volume of sodium hydroxide solution of 30% strength and 0.8 part of sodium hydrosulfite in 300 parts of water. 10 parts of cotton satin are dyed in the resulting dyebath for 1 hour at 60 to 80° C. with the addition of 12 parts of sodium chloride. The cotton is then squeezed, oxidized in air, rinsed, acidified, again rinsed and soaped at the boil. A strong black dyeing id obtained which has very good properties of fastness.

What is claimed is:
1. A compound of the formula

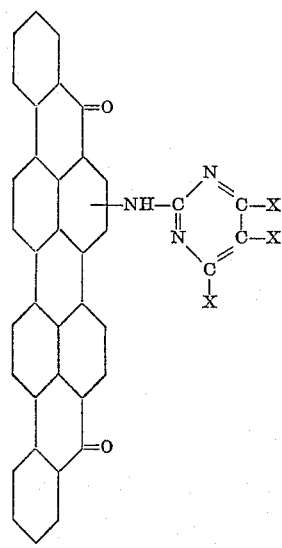

in which two X's represent lower hydroxyalkylamino groups and the third X represents a member selected from the group consisting of hydrogen and lower hydroxyalkylamino.

2. The dyestuff of the formula
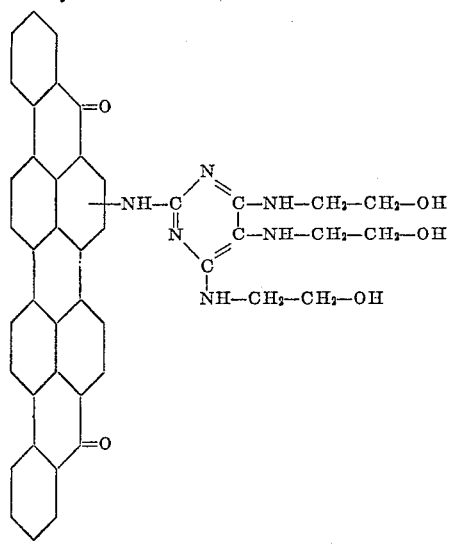
3. The dyestuff of the formula
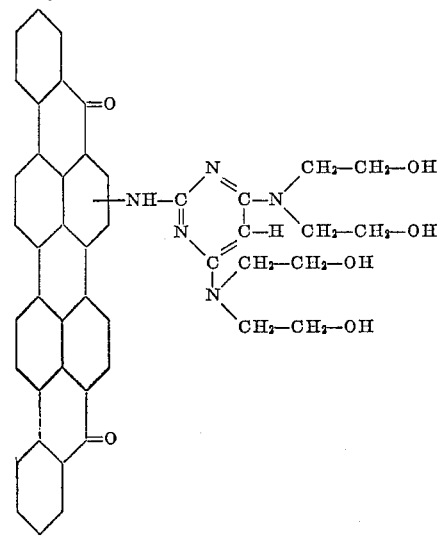
4. The dyestuff of the formula
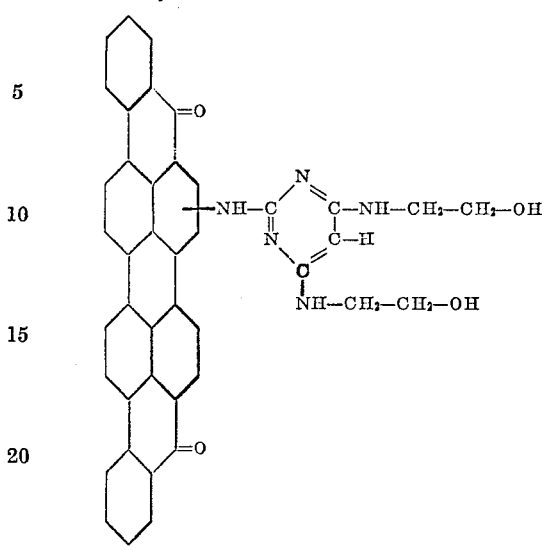
References Cited in the file of this patent
UNITED STATES PATENTS
1,888,631    Kunz et al. _____ Nov. 22, 1932
FOREIGN PATENTS
91,206    Norway _____ Jan. 18, 1958